United States Patent [19]

Bruning

[11] Patent Number: 5,654,798
[45] Date of Patent: Aug. 5, 1997

[54] INTERFEROMETRIC MEASUREMENT OF SURFACES WITH DIFFRACTIVE OPTICS AT GRAZING INCIDENCE

[75] Inventor: John H. Bruning, Pittsford, N.Y.

[73] Assignee: Tropel Corporation, Fairport, N.Y.

[21] Appl. No.: 483,737

[22] Filed: Jun. 7, 1995

Related U.S. Application Data

[63] Continuation-in-part of Ser. No. 375,499, Jan. 19, 1995, abandoned.

[51] Int. Cl.$^6$ .................................................. G01B 9/02
[52] U.S. Cl. ............................................ 356/354; 356/359
[58] Field of Search ............................ 356/354, 359, 356/360

[56] References Cited

U.S. PATENT DOCUMENTS

| | | |
|---|---|---|
| 3,907,438 | 9/1975 | Holeman. |
| 4,391,526 | 7/1983 | McLaughlin. |
| 4,436,424 | 3/1984 | Bunkenburg. |
| 4,606,640 | 8/1986 | Hirst. |
| 4,653,922 | 3/1987 | Jarisch et al.. |
| 4,678,333 | 7/1987 | Anderson. |
| 4,791,584 | 12/1988 | Greivenkamp, Jr.. |
| 4,898,470 | 2/1990 | Cleaveland. |
| 5,041,726 | 8/1991 | Chang et al.. |
| 5,210,591 | 5/1993 | De Groot. |
| 5,220,403 | 6/1993 | Batchelder et al.. |
| 5,249,032 | 9/1993 | Matsui et al.. |
| 5,268,742 | 12/1993 | Magner. |

FOREIGN PATENT DOCUMENTS

| | | |
|---|---|---|
| 0179935 | 5/1986 | European Pat. Off.. |
| 106769 | 7/1974 | Germany. |
| 215388 | 11/1984 | Germany. |
| 233644 | 3/1986 | Germany. |
| 62-177421 | 4/1987 | Japan. |
| 4221704 | 12/1992 | Japan. |
| 4286904 | 12/1992 | Japan. |

OTHER PUBLICATIONS

"Holographically Observed. Torsion in a Cylindrical Shaft" by A. D. Wilson, Applied Optics, vol. 9, No. 9, Sep. 1970, pp. 2093–2097.

"Oblique incidence interferometry applied to non–optical surfaces" by K. G. Birch, Journal of Physics E. Scientific Instruments, 1973, vol. 6, Great Britain, pp. 1045–1048.

"Measurement of Deformatin, in a Cylindrical Shell by Holographic Interferometry" by T. Matsumoto, K. Iwata, and R. Nagata, Applied Optics, vol. 13, No. 5, May 1974, pp. 1080–1084.

"Zone Plate Interferometer" by Raymond N. Smart, May 1974, vol. 13, No. 5, Applied Optics, pp. 1093–1099.

"Improved Oblique–Incidence Interferometer" by P. Hariharan, Optical Engineering, vol. 14, No. 3, May–Jun. 1975, pp. 257–258.

"Holographic Interferometer to test optical surfaces" by Fernando Broder–Bursztyn and Daniel Malacara–Hernandez, Applied Optics, vol. 14, No. 9, Sep. 1975, pp. 2280–2282.

(List continued on next page.)

Primary Examiner—Frank G. Font
Assistant Examiner—Amanda Merlino
Attorney, Agent, or Firm—Eugene Stephens & Associates

[57] ABSTRACT

An interferometer (10) employs diffractive optics (30 and 40) for measuring errors in test surfaces (14) that differ from planes and spheres. A beam of light (28) is separated into two portions (32 and 34). One of the diffractive optics (30) can be used to reshape the second portion (34) of a beam of light (28) into a form that is different than the first portion (32) along a path of grazing incidence to the test surface (14), and the other diffractive optic (40) can be used to further reshape the second portion (34) into a form in common with the first portion (32) of the beam of light (28). The two beam portions (32 and 34) are recombined to produce an interference pattern (44) representing the errors in the test surface (14).

34 Claims, 9 Drawing Sheets

OTHER PUBLICATIONS

"Interferometric surface mapping with variable sensitivity" by W. Jaerisch and G. Makosch, Applied Optics, vol. 17, No. 5, 1 Mar. 1978, pp. 740–743.

"Interferometric construction of circular gratings" by E. Leith, H. Chen, G. Collins, K. Scholten, G. Swanson, and J. Upatnieks, Applied Optics, vol. 19, No. 21, 1 Nov. 1980, pp. 3626–3630.

"Optical figure characterization for cylindrical mirrors and lenses" by Alvin d. Schnurr and Allen Mann, Optical Engineering, vol. 20, No. 3, May/Jun. 1981, pp. 412–416.

"Cylindrical lenses: testing and radius of curvature measurement" by R. Diaz–Uribe, J. Pedraza–Contreras, O. Cardona–Nunez, A. Cordero–Davila, and A. Cornejo Rodriguez, Applied Optics, vol. 25, No. 10, 15 May 1986, pp. 1707–1709.

"Testing cylindrical lenses" by Joseph M. Geary, Optical Engineering, vol. 26, No. 12, Dec. 1987, pp. 1219–1224.

"Data analysis in fiber optic testing of cylindrical optics" by Joseph M. Geary, Optical Engineering, Mar. 1989, vol. 28, No. 3, pp. 212–216.

"Interferometry on Wolter x–ray optics: a possible approach" by Joseph M. Geary, Optical Engineering, vol. 28, No. 3, Mar. 1989, pp. 217–221.

"Constant radial shearing interferometry with circular gratings" by Qing–Shin Ru, Nagaaki Ohyama, Toshio Honda, and Jumpei Tsujiuchi, Applied Optics, vol. 28, No. 15, 15 Aug. 1989, pp. 3350–3353.

"Profile measurement of an aspheric cylindrical surface from retroreflection" by Ding–tin Lin and Der–Shen Wan, Applied Optics, vol. 30, No. 22, 1 Aug. 1991, pp. 3200–3204.

"Profile measurements of cylindrical surfaces" by Der–Shen Wan and Ding–tin Lin, Applied Optics, vol. 32, No. 7, 1 Mar. 1993, pp. 1060–1064.

"Determination of two–dimensional planar displacement by moire fringes of concentric–circle gratings" by Yoon–Chang Park and Seung–Woo Kim, Applied Optics, vol. 33, No. 22, 1 Aug. 1994, pp. 5171–5176.

INTERFEROMETRIC MEASUREMENT OF SURFACES WITH DIFFRACTIVE OPTICS AT GRAZING INCIDENCE

RELATED APPLICATIONS

This application is a Continuation-In-Part of parent application No. 08/375,499, filed 19 January 1995 now abandoned, entitled INTERFEROMETRIC MEASUREMENT OF SURFACES WITH DIFFRACTIVE OPTICS AT GRAZING INCIDENCE. The parent application is hereby incorporated by reference.

TECHNICAL FIELD

The invention relates to the fields of metrology and optics and, in particular, to the use of interferometry for measuring surface contours at grazing incidence, which I define as an off-normal angle of incidence sufficient to produce specular reflection.

BACKGROUND

Interferometers are often preferred over probe-based coordinate measuring machines for measuring test surfaces because the interferometers measure the entire test surfaces at once whereas the coordinate measuring machines measure the test surfaces one point at a time. Movements of the coordinate measuring machines between the different measuring points detract from the accuracy of the measures and require a more controlled operating environment to minimize changes in the test surface during the extended period of measurement.

Interferometers produce images of surfaces in the form of interference patterns that represent contour maps of surface variations. The interference pattern is created by combining a test wavefront (or beam) reflected from the test surface with a reference wavefront (or beam) representing a theoretical reflection from the surface. The two wavefronts are shaped by reflective or refractive optics. Highly reflective surfaces are usually measured by arranging the test wavefront to strike the test surface at normal incidence. Surfaces having lower reflectance are measured at grazing incidence.

However, interferometers are seldom used to measure surfaces other than planes or spheres because matching wavefronts are difficult to produce. Anamorphic optical elements can be used to produce the matching wavefronts; but these elements are expensive, difficult to make and test, and limited in accuracy. More conventional optics can also be used to construct the matching wavefronts by combining smaller portions of spherical or nearly spherical wavefronts. However, combining multiple measurements of conventional optics is time consuming and may require instrument motions that also detract from accuracy.

A less well-known and little developed interferometric approach to measuring both planar and cylindrical surfaces involves the use of diffractive optics for relatively shaping test and reference wavefronts. For example, a 1973 paper entitled "Oblique Incidence Interferometry Applied to Non-Optical Surfaces" by K. G. Birch, Journal of Physics E: Scientific Instruments, Volume 6, reports on the use of a pair of identical diffraction gratings for measuring planar surfaces at grazing incidence. The first diffraction grating divides test and reference wavefronts into different diffraction orders. The test wavefront is reflected from a planar test surface and is recombined with the reference wavefront at the second diffraction grating.

East German Patent 106769 issued to Johannes Schwider in 1974 proposes use of two identical gratings for measuring cylindrical surfaces at grazing incidence. The first diffraction grating divides a planar primary wavefront into test and reference wavefronts. The test wavefront is diffracted into an axiconic wavefront that is reflected from a cylindrical test surface at grazing incidence. The reference wavefront is transmitted without change. The second diffraction grating recombines the two wavefronts by transmitting the test wavefront without further change and by diffracting the reference wavefront into the axiconic form of the test wavefront.

Little practical exploitation of these ideas has been achieved over the last 20 years. Many other alternatives are available for measuring planar surfaces; and further developments are required to provide accurate measurements over a wider range of surface geometries, especially test surfaces that further affect the shape of the test wavefront. Practical considerations relating to alternative setups for particular test pieces, efficiency of light conveyance, and control over image contrast remain unresolved.

SUMMARY OF INVENTION

My invention overcomes the limitations of conventional interferometric systems for measuring test surfaces that differ from planes and spheres by further developing the use of diffractive optics for relatively shaping test and reference wavefronts. Obstacles to the use of diffractive optics are overcome, and specific designs are provided to appropriately shape the test wavefronts to match three-dimensional test surfaces at predetermined grazing angles.

A first version of my invention as a single-pass interferometer includes a light source for producing a primary wavefront. A first diffractive optic (a) divides the primary wavefront into test and reference wavefronts and (b) relatively reshapes the test wavefront with respect to the reference wavefront into a form different than the reference wavefront for reflecting from different areas of a three-dimensional test surface at a predetermined grazing angle, which I define as an off-normal angle inclined to the test surface within a range of specular reflection. A second diffractive optic (a) recombines the test and reference wavefronts and (b) further relatively reshapes the test wavefront with respect to the reference wavefront into a form in common with the reference wavefront for producing a pattern of interference indicative of variations in the test surface. The first and second diffractive optics differ from one another to accommodate test surfaces that further affect the shape of the test wavefront.

Preferably, the primary wavefront is shaped as a plane or sphere so that it is easily produced and conveyed by conventional optics. The first diffractive optic reshapes the test wavefront into a form, such as an axiconic wavefront, that differs from both planes and spheres. After reflecting from the test surface, the second diffractive optic further reshapes the test wavefront back into a plane or sphere. Any deviations of the reflected test wavefront from a theoretical wavefront that is generated and encoded by the diffracting pattern of the diffractive optics are apparent in the resulting interference pattern with the reference wavefront.

The two diffractive optics preferably are aligned with a common reference axis, which corresponds to a reference point of the interference pattern. Angles about the common reference axis at points of reflection from the test surface correspond to angles about the reference point of the interference pattern. However, axial distances along the common reference axis at the points of reflection from the test surface relate to radial distances from the reference point of the interference pattern. Deviations in the test surface height at the points of reflection are measurable at the corresponding angular and radial positions in the interference pattern as phase differences between the test and reference wavefronts.

A second version of my invention is arranged as a double-pass interferometer. A light source produces a primary wavefront that is divided into a reference wavefront and a test wavefront, and a first diffractive optic diffracts the test wavefront along a path of grazing incidence to a test surface. However, in contrast to the first version of my invention, a reflective optic retroreflects the test wavefront back to the test surface along a return path that subsequently combines with a path of the reference wavefront for producing an interference pattern representing variations in the test surface.

The reflective optic that retroreflects the test wavefront can be a mirror or a second diffractive optic. A partially reflective surface can be associated with the first diffractive optic for reflecting a portion of the primary wavefront as the reference wavefront and for transmitting another portion of the primary wavefront as the test wavefront. The partially reflective surface also transmits the returning test wavefront in alignment with the reflected reference wavefront. Alternatively, the first diffractive optic can be arranged to divide the primary wavefront into the reference and test wavefronts, and the second diffractive optic can be arranged to retroreflect both wavefronts back to the first diffractive optic, where they are recombined to produce the pattern of interference.

A third version of my invention can be arranged as either a single- or double-pass interferometer but features specially arranged paths for separately conveying test and reference wavefronts. A light source produces a primary wavefront which is divided into test and reference wavefronts. A first path through the interferometer (a) reshapes the test wavefront from a form in common with the reference wavefront to a different form and (b) reflects the test wavefront at grazing incidence to the test surface. A second path through the interferometer conveys the reference wavefront independently of the test surface between positions of alignment with the test wavefront. A following diffractive optic further reshapes the reflected test wavefront into a form in common with the reference wavefront. A common path combines the further reshaped test wavefront with the reference wavefront and produces a pattern of interference between the test and reference wavefronts indicative of variations in the test surface. However, the reference wavefront is conveyed along the second and common paths independently of the following diffractive optic.

Preferably, the third version includes a leading diffractive optic as well as a following diffractive optic. The leading diffractive optic reshapes the test wavefront for reflecting from the test surface at grazing incidence. One or more beamsplitters divide and recombine the test and reference wavefronts independently of the leading and following diffractive optics. Since the diffractive optics are used to convey only the test wavefront, diffraction energies of the diffractive optics can be concentrated into single diffractive orders.

The diffractive optics can be amplitude or phase modulated with diffracting patterns formed by "grooves" or other discontinuities having nonlinear paths that are shaped to correspond with transverse sections of the test surface along the reference axis. Spacing between the grooves, also referred to as "pitch", can be varied to control angles of diffraction. Blazing or other known techniques can be used to match intensities of the test and reference wavefronts to maximize contrast of the interference pattern. One of the diffractive optics can be moved relative to the test piece to provide phase shifting for more accurately interpreting the interference pattern. Also, an alternative setup can be obtained with the same diffractive optics by positioning the following diffractive optic after a crossover point of focus produced by an internal reflection from the test piece.

DETAILED DESCRIPTION

Figure 1:
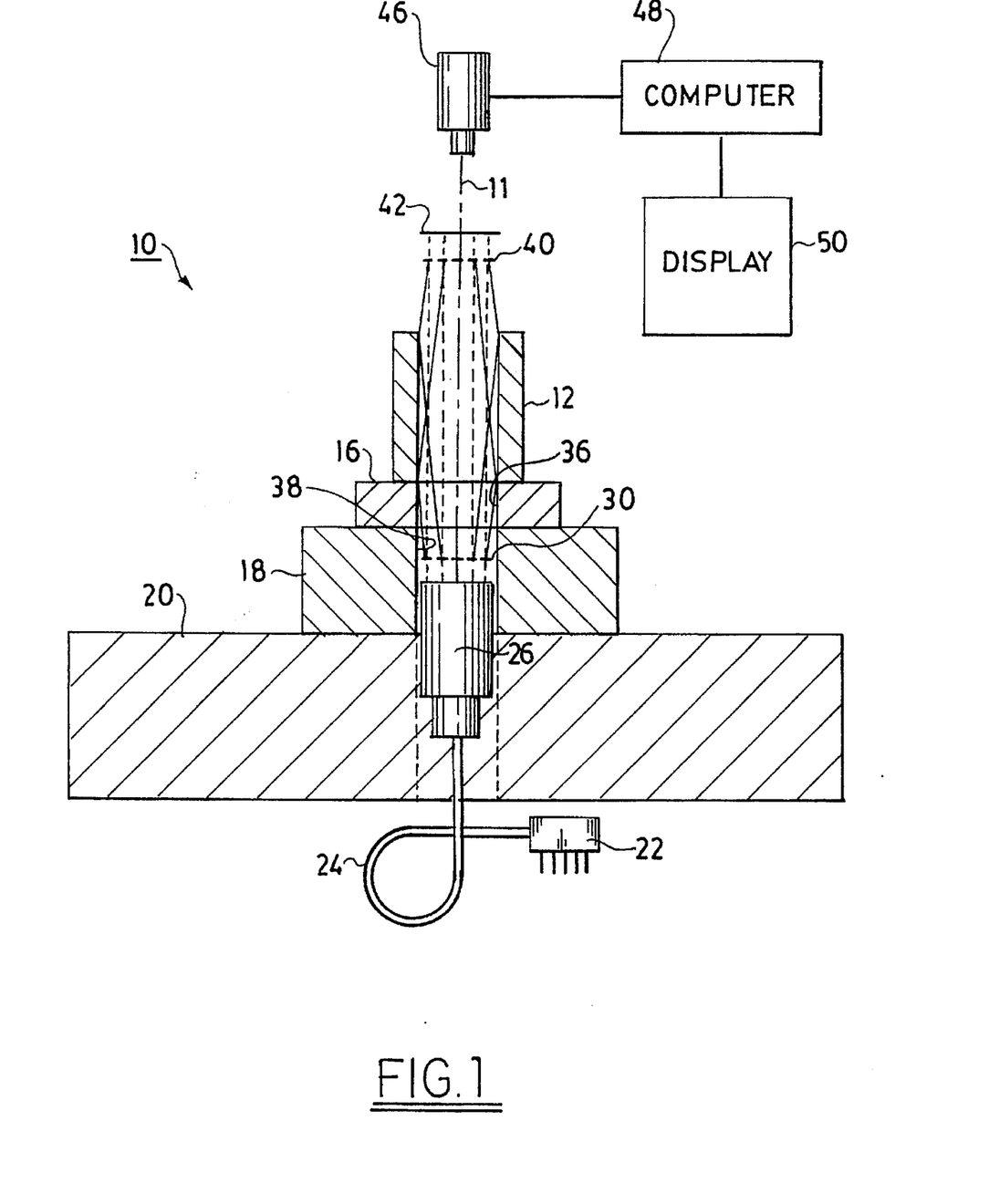
FIG. 1 is a schematic diagram of my new interferometer set up for single-pass measurement with two diffractive optics.

My invention is illustrated in FIG. 1 as a single-pass interferometer 10, incorporating features of a conventional Mach-Zender interferometer. A test piece 12, shown also in FIG. 2, has an inside cylindrical surface 14 under test with an axis of symmetry 15 that is aligned with a reference axis 11 of the interferometer 10. The test piece 12 is mounted on an air bearing 16 carried by a surface plate 18 on a base 20. The air bearing 16 provides both rotational and translational control over the test piece 12 to permit multiple measures from different positions. Mathematical comparisons between the multiple measures can be used to separate systematic errors.

A light source 22, such as a laser diode or a HeNe laser, produces a beam of coherent light. An optical fiber 24 transmits the beam through the base 20 to a collimator 26 that shapes the beam into a planar primary wavefront 28 represented by selected rays. A leading diffractive optic 30, such as a circular transmissive diffraction grating or binary optic, divides the planar wavefront 28 into a reference wavefront 32 and a test wavefront 34. The reference wavefront 32 remains a planar wavefront. However, the test wavefront 34 is reshaped by the leading diffractive optic 30 into an axiconic wavefront composed of rays that are uniformly inclined to the reference axis 11 through a first diffraction angle "μ", which is measured within axial planes of the reference axis 11.

Respective openings 36 and 38 through the air bearing 16 and the surface plate 18 provide clearance enabling the reference and test wavefronts 32 and 34 to propagate along the reference axis 11 through a hollow center of the test piece 12. The test wavefront 34 reflects from different positions of the cylindrical test surface 14 at a constant grazing angle "θ". A following diffractive optic 40 further reshapes the reflected test wavefront 34 back into a planar wavefront through a second diffraction angle "ν". For measuring nominally straight cylindrical surfaces, the two diffraction angles "μ" and "ν" are equal to each other and to the constant grazing angle "θ".

Figure 3:
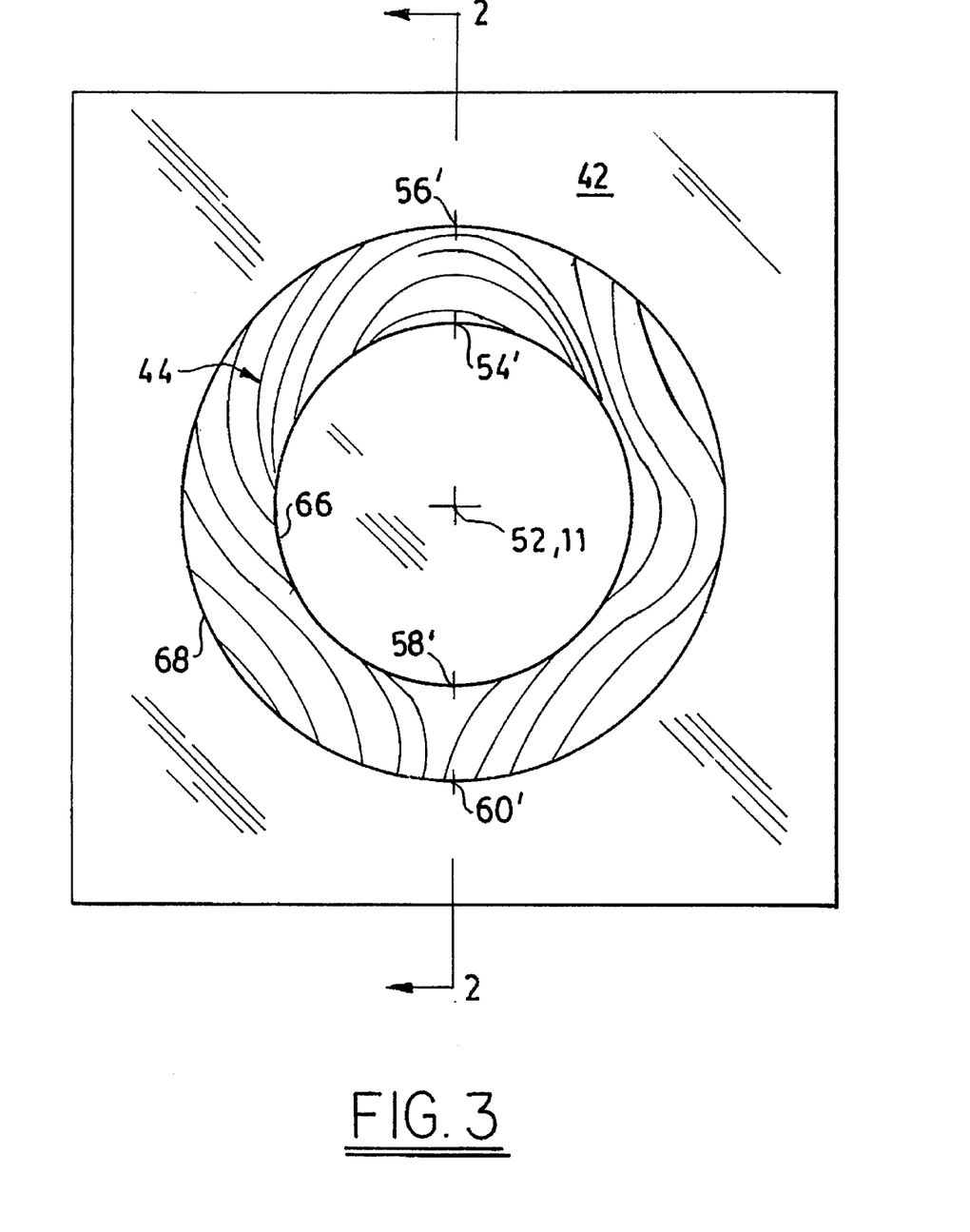
FIG. 3 is an axial view of an image-forming optic displaying an interference pattern representative of deviations in the test surface.

Thus, both the reference and test wavefronts 32 and 34 emerge from the following diffractive optic 40 as interfering planar wavefronts. With reference also to FIG. 3, an image-forming optic 42 images a pattern (referred to as an interferogram) 44 of the interference at the following diffractive optic 40 onto an image-recording device, such as a camera 46. The imaged interference pattern 44, which is superimposed on the test surface 14, represents deviations of the test surface 14 from a theoretical cylindrical surface.

The camera 46, which preferably incorporates a solid state or a charge-coupled device (CCD), records the interference pattern for processing by a computer 48. The image-forming optic can be incorporated into the camera 46 or can be provided as one or more separate elements. A display device 50, such as a cathode-ray tube, flat panel device, or printer, displays information about the cylindrical test surface 14 in a useful form. In addition to topographical information, derivable measures such as roundness, straightness, taper, and cylindricity could also be displayed. Alternatively, the information could be electronically stored or transmitted for use in another operation, such as feedback to a manufacturing operation.

FIG. 3 depicts the annular interference pattern 44 that appears at the following diffractive optic 40. A reference point 52 in the interference pattern 44 coincides with a point of intersection by the reference axis 11. Exemplary points of reflection 54, 56, 58, and 60 from the cylindrical test surface 14 correspond to points 54', 56', 58', and 60' in the interference pattern 44.

Angles about the reference axis 11 between the points of reflection 54, 56 and 58, 60 from the cylindrical test surface 14 correspond to similar angles between the points 54', 56' and 58', 60' about the reference point 52. However, axial distances along the reference axis 11 between the points of reflection 54, 58 and 56, 60 relate to radial distances between the points 54', 58' and 56', 60' from the reference point 52. For example, the points of reflection 54 and 58 at one end 62 of the cylindrical test surface 14 have corresponding points located at a shorter radial distance in the interference pattern 44 than the points of reflection 56 and 60 at the other end 64 of the cylindrical test surface 14.

Height deviations of the cylindrical test surface 14 from the theoretical test surface at the points of reflection 54, 56, 58, and 60 appear as phase differences at the corresponding points 54', 56', 58', and 60' in the interference pattern 44. Accurate measures of these phase differences are obtained by conventional phase shifting techniques in which optical path differences between the reference wavefront 32 and the test wavefront 34 are stepped through integer subdivisions of one wavelength. Intensity information at each phase step is stored and a complete phase map is calculated by established Fourier series methods. The stepping can be accomplished in a variety of ways such as by axially translating one of the diffractive optics 30 or 40, preferably the leading optic 30, or by changing the wavelength of the primary wavefront 28.

Sensitivity of the interferometer 10, which is a measure of the amount of deviation represented by adjacent fringes in the interference pattern 44, decreases with increasing grazing angles "θ". Accordingly, larger grazing angles "θ" within the range of specular reflection of the test surface 14 are preferred for improving accuracy of individually measured points.

However, grazing angles "θ" can also affect the size of the diffractive optics as well as the resolving power of the interferometer 10. The camera 46 is preferably arranged with an adjustable focus to equalize the resolution of points imaged along the innermost and outermost circumferences 66 and 68 of the interference pattern 44. Some limitation of the imaging angles seen by the camera 46 may be desirable to control differences between the resolution of points imaged along the innermost and outermost circumferences 66 and 68 of the interference pattern.

Figure 4:
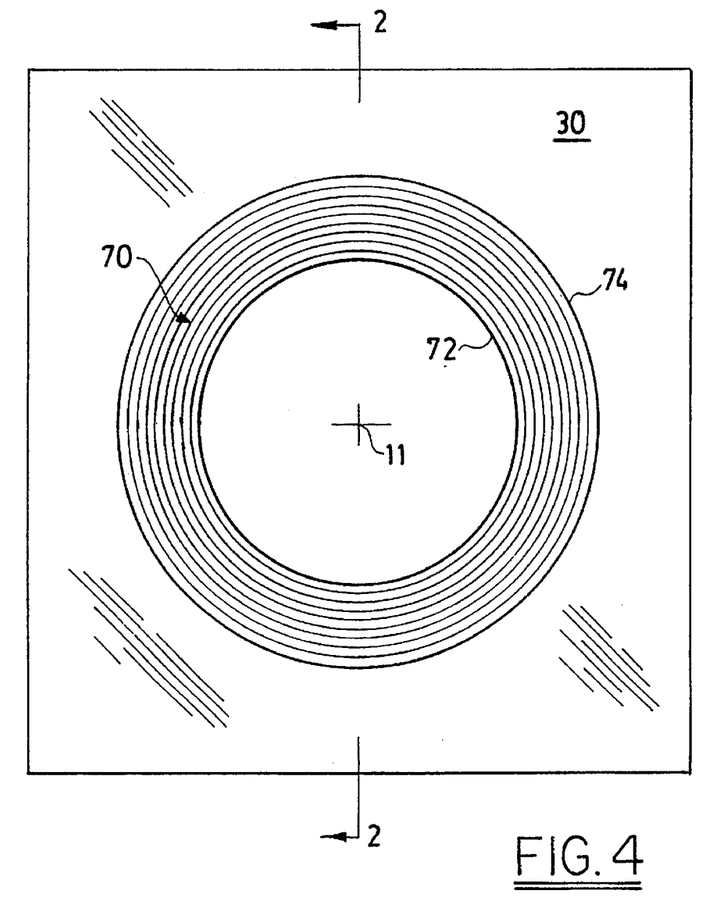
FIG. 4 is an axial view of one of the diffractive optics.
Figure 5:
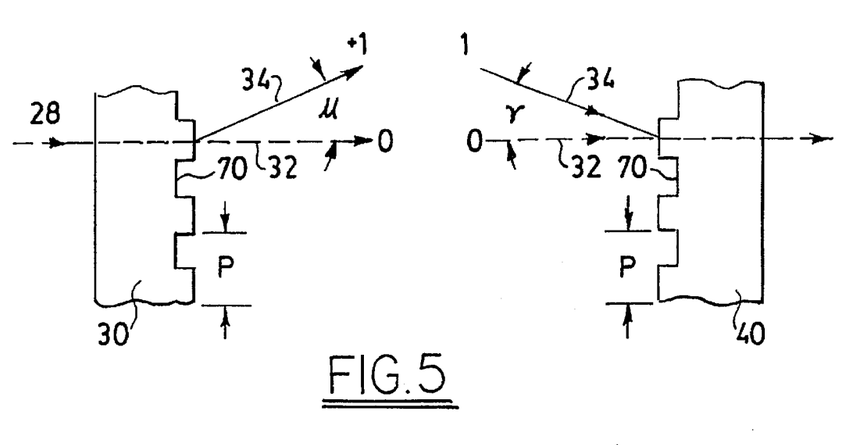
FIG. 5 is a fragmentary cross-sectional view of two diffractive optics.

The leading and following diffractive optics 30 and 40 are further illustrated by FIGS. 4 and 5. In FIG. 4, the leading diffractive optic 30 is shown as a diffraction grating having a diffracting pattern formed by a number of concentric closed-shaped grooves 70 for dividing light into two different diffraction orders. The following diffractive optic 40 is preferably a similar grating oriented as shown in the fragmentary cross-sectional view of FIG. 5. With the zero diffraction order aligned with the reference axis 11, positive or "+" diffraction orders refer to light rays that are diffracted toward the reference axis 11 and negative or "−" diffraction orders refer to light rays that are diffracted away from the reference axis 11.

The reference wavefront 32 is preferably transmitted (diffracted) by both diffractive optics 30 and 40 at a zero diffraction order, and the test wavefront 34 is preferably transmitted (diffracted) by both optics 30 and 40 at a first diffraction order. However, the leading diffractive optic 30 is oriented for dividing the reference and test wavefronts 32 and 34, and the following diffractive optic 40 is oriented for combining the two wavefronts 32 and 34.

The grooves 70 in both gratings are spaced at a constant pitch "p" for uniformly inclining the test beam 34 with respect to the reference beam 32 through the diffraction angles "μ" and "ν". Sensitivity, as a measure of units per fringe, is equal to one-half of the pitch "p" for first order diffractions of the test wavefront. Although varying in scale, the grooves 70 have paths that are shaped to match transverse sections of the cylindrical test surface 14. For example, inner groove 72 matches the circular section at the far end 64 of the test surface 14, and outer groove 74 matches the circular section at the near end 62 of the test surface 14. Together, the shape and spacing of the grooves 70 represent a mathematical description of the test surface 14.

Profiles of the grooves 70 can be shaped to control diffraction energies in the zero, first, and higher diffraction orders. For example, the grooves 70 can be blazed to concentrate diffraction energies within only two diffraction orders, which are used for diffracting the reference and test wavefronts 32 and 34. The depth or width of the grooves 70 can also be varied to appropriately divide the diffraction energies between the interfering reference and test wavefronts 32 and 34 to maximize contrast of the interference pattern 44. Accounting also for the reflectivity of the test surface 14, either or both of the diffractive optics 30 or 40 can be modified to accomplish this.

The diffractive optics 30 and 40 can be made to high accuracy by photolithographically exposing and etching coatings under computer control. This method of manufacture enables complex mathematical descriptions of test surfaces to be readily embedded into the diffractive optics. Alternatively, the diffractive optics 30 and 40 can be made by etching glass substrates for improving durability or by modifying the underlying substrate to exhibit similar modulations in amplitude or phase.

Figure 6:
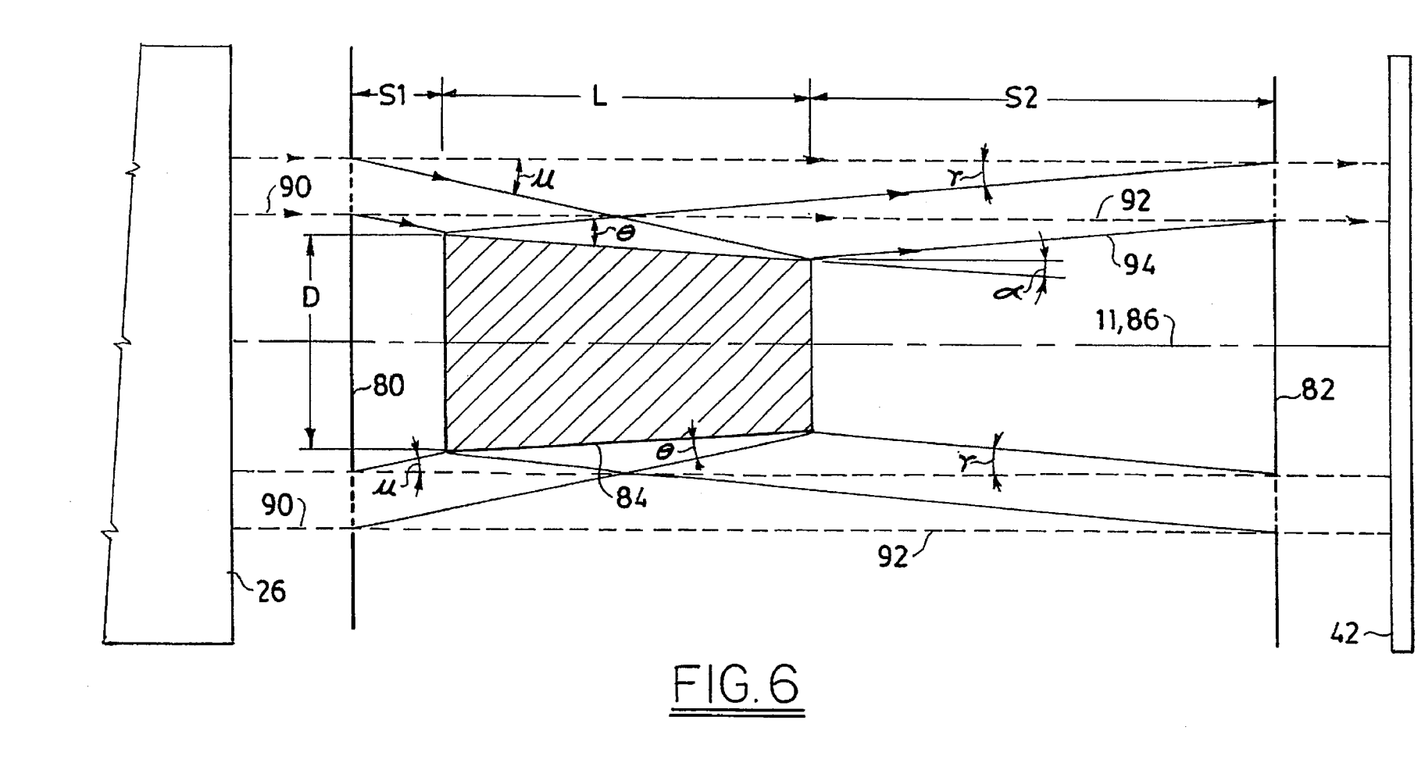
FIG. 6 is a diagram of diffractive optics used in the interferometer for measuring external conical test surfaces.
Figure 7:
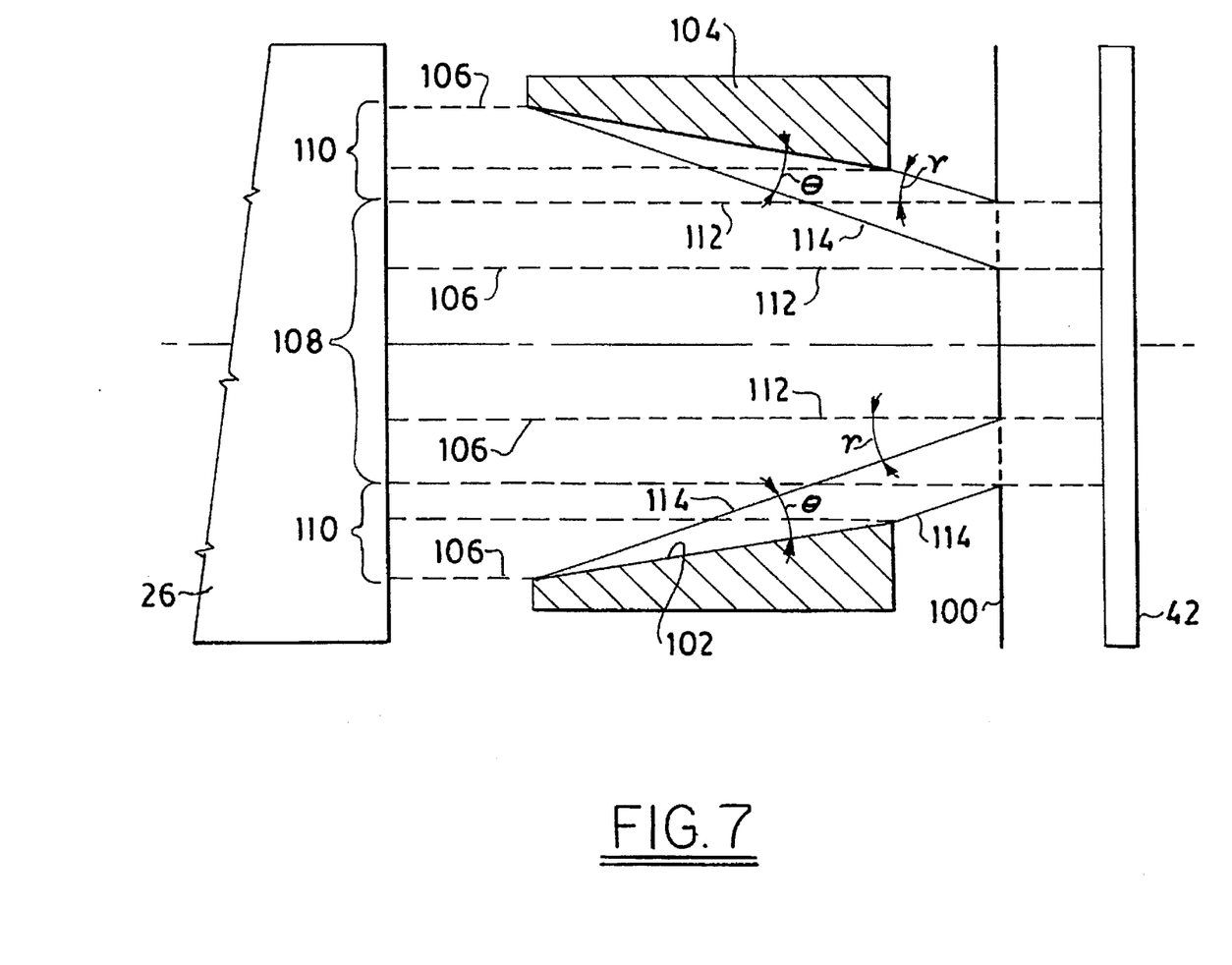
FIG. 7 is a diagram of a single diffractive optic used for measuring internal conical test surfaces.

FIGS. 6 and 7 show alternative arrangements of the diffractive optics for measuring tapered test surfaces. For example, FIG. 6 shows alternative leading and following diffractive optics 80 and 82 for measuring an external conical test surface 84 having a taper angle "$\alpha$" with respect to an axis of symmetry 86.

A planar primary wavefront 90 is split by the leading diffractive optic 80 into a planar reference wavefront 92 and an axiconic test wavefront 94 composed of rays inclined to the reference axis 11 through the first diffraction angle "$\mu$". The test wavefront 94 is reflected by the conical test surface 84 at a constant grazing angle "$\theta$". The following diffractive optic 82 rediffracts the reflected test wavefront 94 through the second diffraction angle "$\nu$" into a planar form aligned with the reference wavefront 92. The two diffraction angles "$\mu$" and "$\nu$" are related to the taper angle "$\alpha$" and the grazing angle "$\theta$" as follows:

$$\mu - \nu = 2\alpha$$

$$\mu + \nu 2\theta$$

Figure 2:
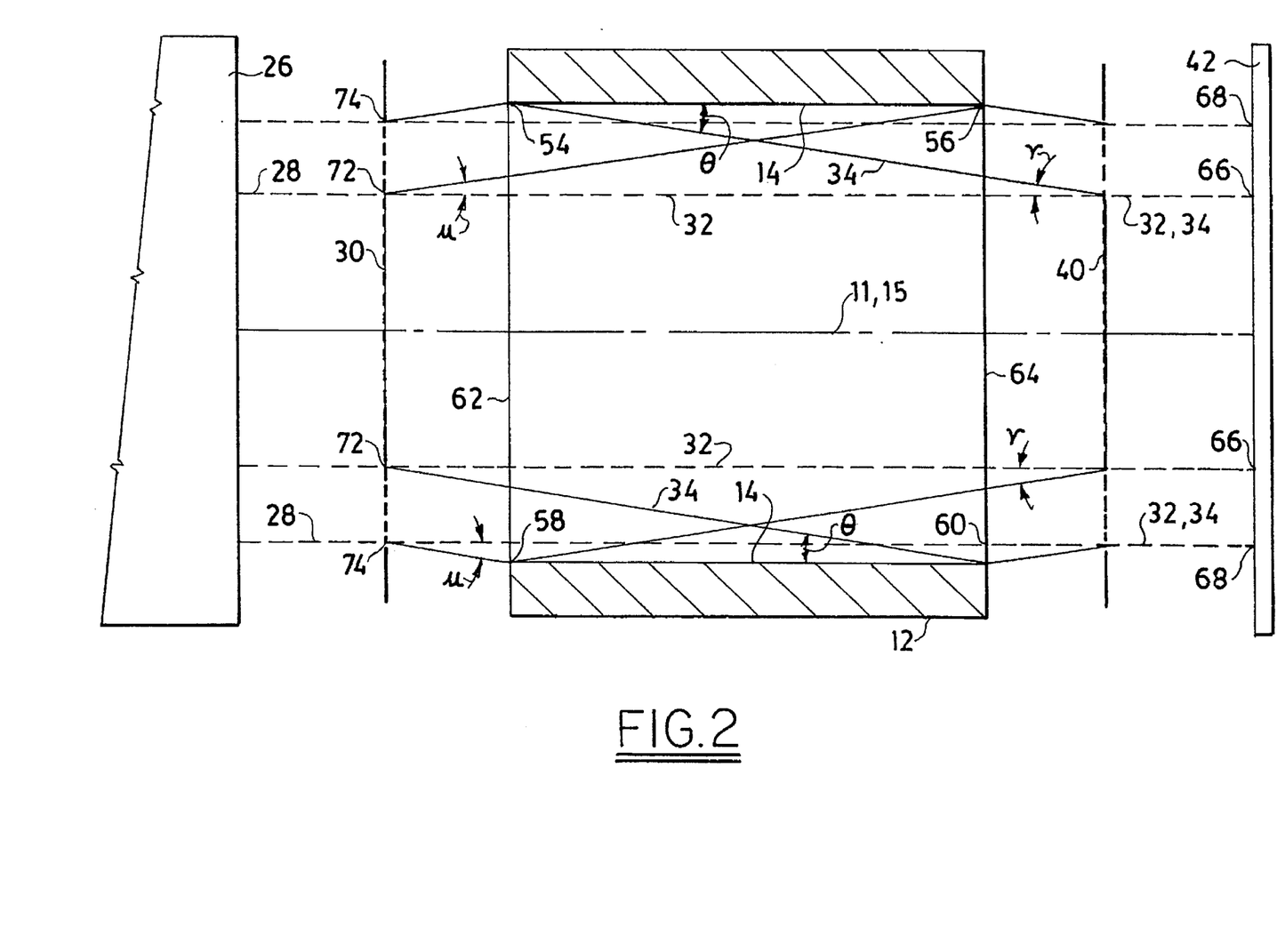
FIG. 2 is a diagram of the diffractive optics used in the interferometer for measuring internal cylindrical test surfaces.

Preferably, the leading and following diffractive optics 80 and 82 are located along the reference axis 11 in relative positions required to size the two optics 80 and 82 equally. These relative positions are defined by the following equation:

$$(S2+L) \tan \nu = (S1+L) \tan \mu - L \tan \alpha$$

where "S1" is an axial distance between the first diffractive optic 80 and the test surface 84, "S2" is an axial distance between the test surface 84 and the second diffractive optic 82, and "L" is the axial length of the test surface 84. Different relative positions can be used to satisfy other optical or mechanical considerations when the test surface is defined by a surface of revolution. For example, the following diffractive optic of FIG. 2 could be positioned beyond a cross-over point of a converging test wavefront to provide better access to the test piece.

An inner diameter "ID" and an outer diameter "OD" of the equally sized diffractive optics 80 and 82 are related to the diameter "D" of the conical test surface 84 as follows:

$$ID = D + 2 \, S1 \tan \mu,$$

$$OD = D + 2(L+S2) \tan \nu$$

FIG. 7 depicts a special arrangement of my interferometer 10 in which only a single diffractive optic 100 is used. A conical test surface 102 of a hollow test piece 104 is inclined to a primary wavefront 106 at a grazing angle "$\theta$". An inner portion 108 of the primary wavefront 106 is transmitted through the hollow center of the test piece 104 as a reference wavefront 112, and an outer portion 110 of the primary wavefront 106 is reflected by the conical test surface 102 as a test wavefront 114. The single diffractive optic 100 functions as a following diffractive optic for combining the reference and test wavefronts 112 and 114 and for reshaping the test wavefront 114 into a planar form through a diffractive angle "$\nu$", which is related to the grazing angle "$\theta$" as follows:

$$\nu = 2\theta$$

Although the single diffractive optic 100 is preferably a transmissive diffractive optic, a reflective diffractive optic could be substituted for this or other diffractive optics used in the preceding arrangements to vary optical paths within the interferometer. For example, the diffractive optic 100 could be made with a reflective coating and used for returning the combined reference and test wavefronts 112 and 114 along the reference axis or used for retroreflecting the test wavefront 114 in combination with a partially reflective surface for returning approximately one-half of the outer portion 110 of the primary wavefront 106 as an alternative reference wavefront.

Different diffraction orders of the diffractive optics could also be used to divide or combine the reference and test wavefronts. For example, the reference wavefront could be diffracted into a positive first order and the test wavefront could be diffracted into a negative first order for relatively reshaping both wavefronts. In addition, similar leading and following diffractive optics could be used in different orders. For example, the following diffractive optic could be used at a higher diffraction order than the leading diffractive optic (or vice versa) for testing surfaces that have a high angle of inclination to the reference axis. The test wavefront could be diffracted by the following diffractive optic at a zero order and the reference wavefront could be diffracted at a higher order to match the test wavefront.

Figure 8:
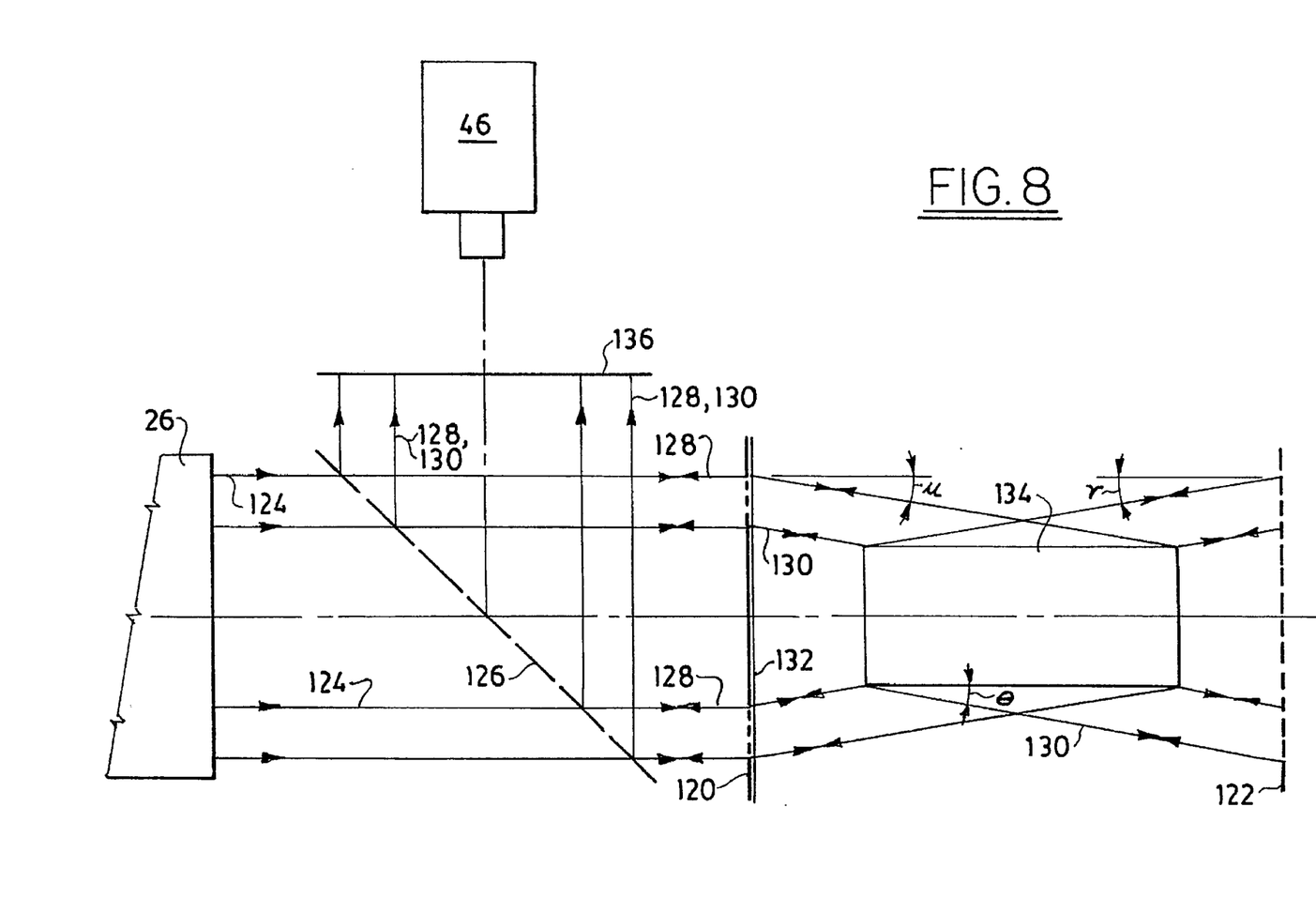
FIG. 8 is a diagram of my interferometer set up for double-pass measurement with two diffractive optics.

The interferometer for practicing my invention can also be set up for double-pass measurement. For example, FIG. 8 shows a double-pass arrangement of my invention incorporating features of a Fizeau interferometer in which a first diffractive optic 120 is a partially transmissive diffraction grating and a second diffractive optic 122 is a reflective diffraction grating.

A planar primary wavefront 124 produced by the collimator 26 passes through a beamsplitter 126 to the first diffractive optic 120, which divides the planar primary wavefront 124 into a reference wavefront 128 and a test wavefront 130. The reference wavefront 128 is separated from the test wavefront 130 by a partially reflective coating 132 that retroreflects the reference wavefront 128 on a return path to the beamsplitter 126 (i.e., toward the light source). The test wavefront 130 is transmitted through the first diffractive optic 120 at a first diffraction angle "$\mu$" along a path that strikes a test surface 134 at a constant grazing angle "$\theta$".

The second diffractive optic 122 retroreflects the test wavefront at a second diffraction angle "$\theta$" back to the test surface 134 along a return path toward the beamsplitter 126. Along the return path, the first diffractive optic 120 rediffracts the test wavefront through the first diffraction angle "$\mu$" back into a form in common with the reference wavefront 128 reflected by the coating 132. The returning reference and test wavefronts 128 and 130 are reflected by the beamsplitter 126 to an image-forming optic 136 that images an interference pattern superimposed on the test surface 134 at the first diffractive optic 120 onto the camera 46.

Both of the diffractive optics 120 and 122 are preferably blazed to concentrate diffraction energies into single diffractive orders. However, a partially reflective optic, such as a reference flat, could be substituted for the partially reflective coating 132 along the path of the primary wavefront 124 following the beamsplitter 126. Preferably, the partially reflective optic is also positioned along the return path of the test wavefront 130 to the beamsplitter 126 for forming the interference pattern.

Alternatively, the first diffractive optic 120 could be arranged to transmit the reference wavefront at a different diffraction order (e.g., the zero order) than the test wavefront. The second diffractive optic 122 could also employ a different diffraction order to retroreflect the reference wavefront along a return path to the beamsplitter 126 in place of the partially reflective optic. Along the return path, the first diffractive optic 120 would also function to recombine the reference and test wavefronts to produce the interference pattern.

Figure 9:
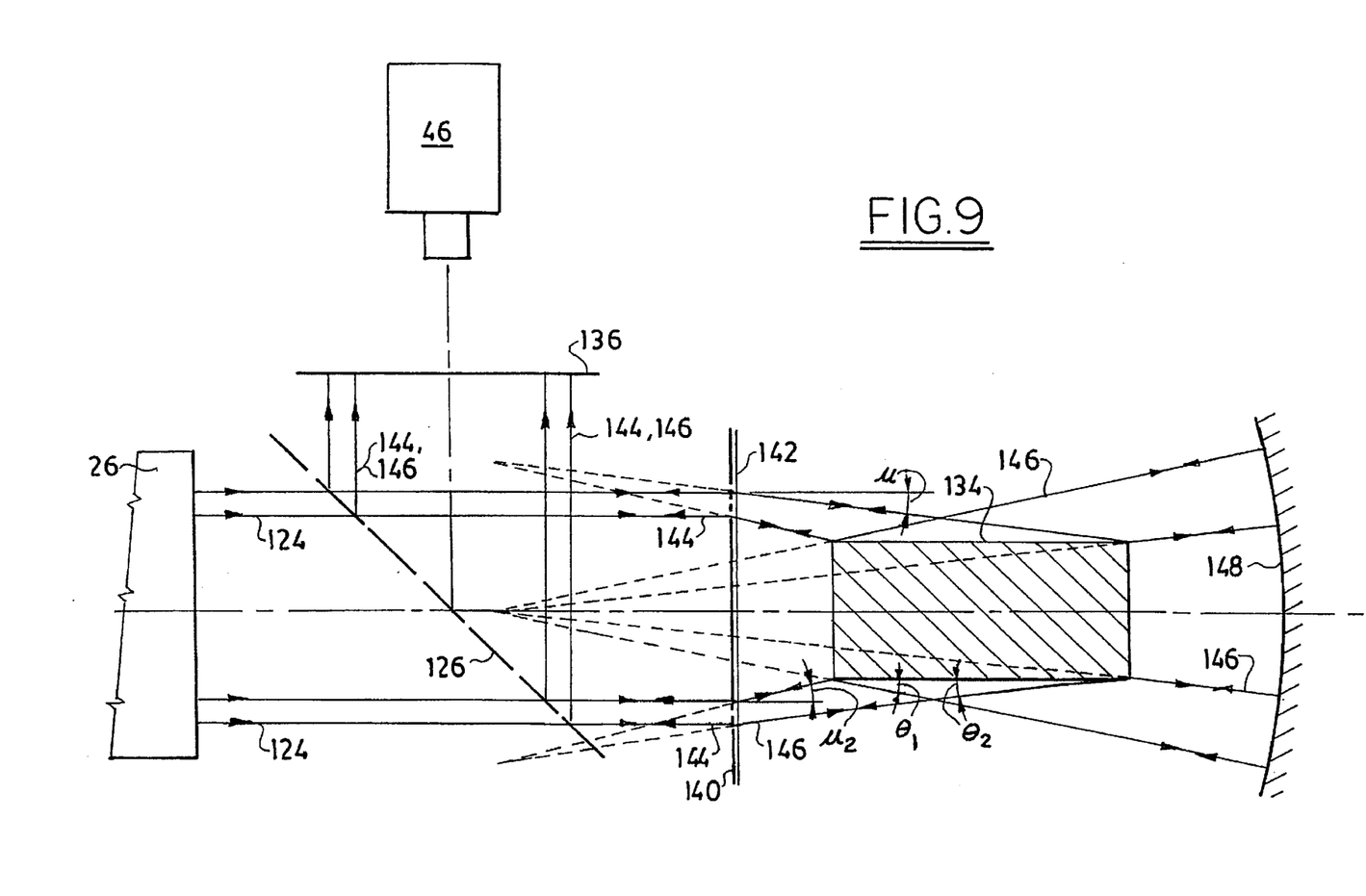
FIG. 9 is a diagram of my interferometer set up for double-pass measurement with a single diffractive optic.

FIG. 9 also shows a double-pass configuration but with only one diffractive optic 140. Similar to the preceding embodiment, the primary wavefront 124 is transmitted through the beamsplitter 126. The diffractive optic 140 has a partially reflective coating 142 that retroreflects a first portion of the primary wavefront 124 as a reference wavefront 144 and diffracts a second portion of the primary wavefront 124 as a test wavefront 146.

However, the diffractive optic 140 is preferably a diffraction grating with variable pitch grooves to vary the first diffraction angle between "$\mu_1$" and "$\mu_2$". The grazing angles "$\theta_1$" and "$\theta_2$" show similar variation for reflecting the test wavefront 146 from the test surface 134 as a spherical wavefront. A spherical mirror 148 retroreflects the test wavefront 146 along a return path to the diffractive optic 140, where it is combined with the test wavefront 146 for producing an interference pattern indicative of variations in the test surface 134.

Other reflective optics could be used to return the test wavefront along its original path, including plane mirrors for measuring conical test surfaces. An alternative partially reflective surface, including a separate optic or another surface treatment, could be substituted for the coating 142 similar to the preceding embodiment. The diffraction grating 140 could also be blazed to concentrate diffraction energies in the test wavefront. Various combinations of reflective and/or anti-reflective coatings and blazing schemes can also be used for optimizing contrast and light efficiency.

Figure 10:
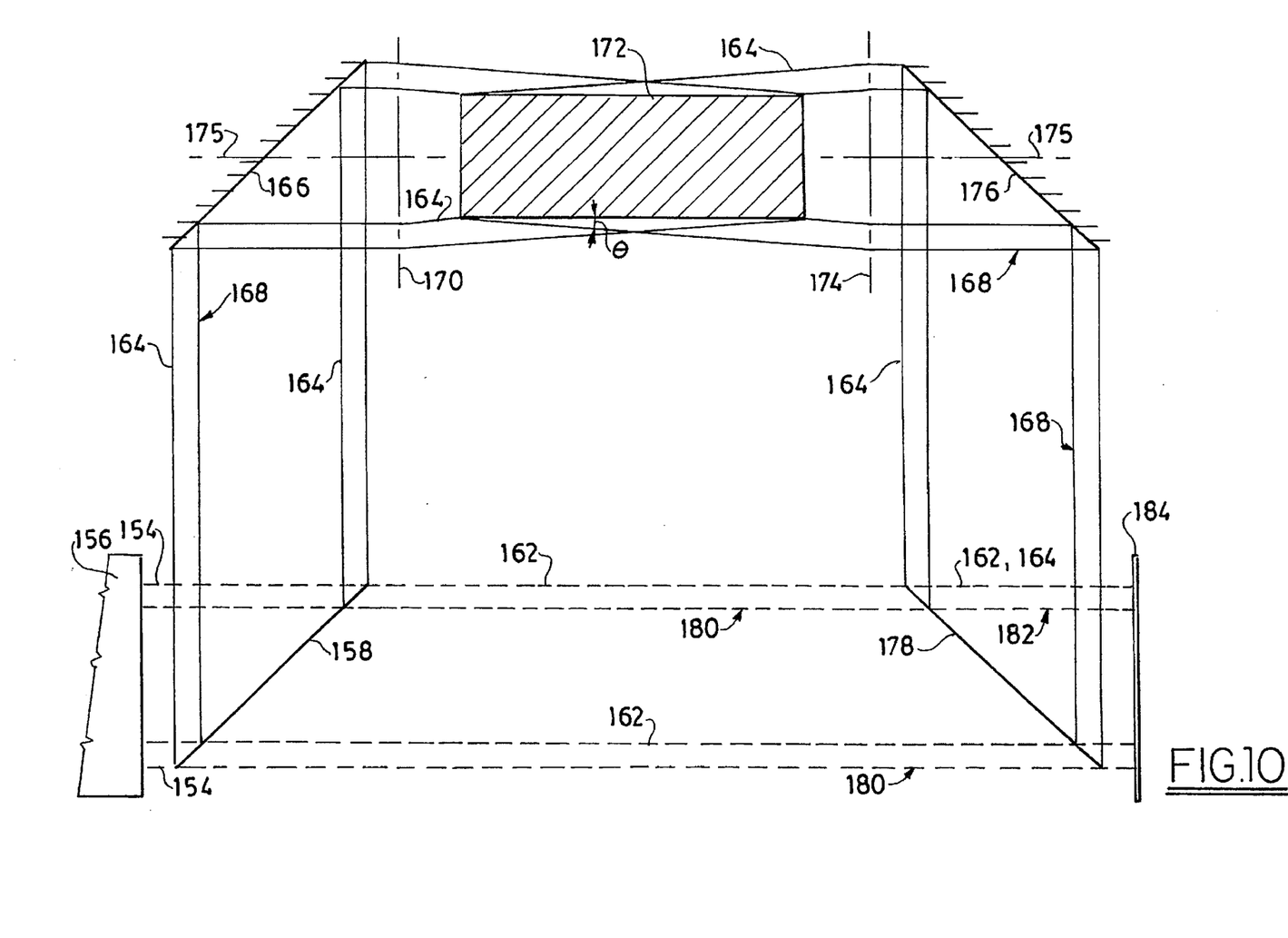
FIG. 10 is a diagram of my interferometer set up for single-pass measurement using different paths for test and reference wavefronts.

Another embodiment of my invention as a single-pass interferometer is illustrated in FIG. 10; but in contrast to the earlier single-pass embodiments, the reference wavefront is conveyed independently of the leading and following diffractive optics that reshape the test wavefront. Thus, similar to the double-pass embodiments, the diffractive optics can be limited to single diffractive orders.

A planar primary wavefront 154 emitted from a collimator 156 is divided by a first beamsplitter 158 into a planar reference wavefront 162 and a planar test wavefront 164. A first plane mirror 166 conveys the planar test wavefront 164 along a first path 168 to a leading diffractive optic 170, where it is reshaped into an axiconic wavefront that is reflected from a test surface 172 at a predetermined grazing angle θ. A following diffractive optic 174 further reshapes the test wavefront 164 back into a planar wavefront.

The leading and following diffractive optics 170 and 174 are aligned along the first path 168 with a common reference axis 175 which corresponds to an axis of symmetry of the test surface 172. Since only the test wavefront 164 is conveyed along the first path 168, all of the diffraction energies of the two diffractive optics 170 and 174 can be concentrated into single diffractive orders.

The test wavefront 164 emerging from the following diffractive optic 174 is further conveyed along the first path 168 by a second plane mirror 176 to a second beamsplitter 178, where it is recombined with the reference wavefront 162 traveling along a second path 180 between the two beamsplitters 158 and 178. The combined reference and test wavefronts 162 and 164 emerge from the second beamsplitter 178 along a common path 182 to an image forming optic 184 for producing an interference pattern indicative of variations in the test surface 172.

Instead of using both two plane mirrors 166 and 176 and two transmissive diffractive optics 170 and 174, the two diffractive optics could be repositioned and made with reflective surfaces for replacing the two plane mirrors. Variations can be made in the diffractive optics 170 and 174 similar to those made in the preceding embodiments for reshaping the test wavefront to accommodate a variety of different test surfaces.

My invention can also be used to measure other and more complex three-dimensional test surfaces, including inside and outside surfaces of non-circular cylinders and cones, involute profiles, and gear teeth. The nonlinear paths of the diffractive optics can be varied to match non-circular transverse sections of test surfaces, and the pitch spacing of the grooves can be varied to match curvatures in axial sections of test surfaces. The diffractive optics can also be stepped or curved to further shape the wavefronts or to provide focusing qualities. Limited sections of the gratings can be used to measure surfaces that lack an axis of symmetry. Where possible, sensitivity of the interferometer along the reference axis is preferably held constant but can be varied by changing the pitch of the grating grooves.

I claim:

1. A double-pass interferometer for measuring variations in a test surface at grazing incidence comprising:

a light source for producing a primary wavefront that is divided into a reference wavefront and a test wavefront;

a transmissive diffractive optic for diffracting the test wavefront into a form different from the reference wavefront along a path of grazing incidence to the test surface; and a reflective optic for retroreflecting the test wavefront back to the test surface along a return path toward said light source;

said transmissive diffractive optic being located along the return path of the test wavefront for rediffracting the test wavefront into a form similar to the reference wavefront for producing a pattern of interference indicative of the variations in the test surface.

2. The interferometer of claim 1 in which said transmissive diffractive optic is a diffraction grating arranged to concentrate diffracted energy within one diffraction order.

3. The interferometer of claim 1 in which a partially reflective surface is located along a path of the primary wavefront for reflecting the reference wavefront along a return path toward said light source.

4. The interferometer of claim 3 in which said partially reflective surface is also located along the return path of the test wavefront for combining the reference and test wavefronts.

5. The interferometer of claim 4 in which said partially reflective surface is formed on said transmissive diffractive optic.

6. The interferometer of claim 1 in which said reflective optic is a reflective diffractive optic.

7. The interferometer of claim 6 in which said reflective diffractive optic is a reflective diffraction grating.

8. The interferometer of claim 7 in which said reflective diffraction grating is arranged for balancing diffraction energies of the recombined reference and test wavefronts.

9. The interferometer of claim 6 in which said reflective diffractive optic also retroreflects the reference wavefront along its return path toward said light source.

10. The interferometer of claim 1 in which said reflective optic is a mirror.

11. The interferometer of claim 10 in which said transmissive diffractive optic is a diffraction grating having unequally spaced grooves to vary the angle of incidence along the test surface.

12. The interferometer of claim 11 in which said reflective optic is a spherical mirror.

13. The interferometer of claim 1 in which said transmissive diffractive optic has a diffracting pattern of nonlinear paths.

14. An interferometer for measuring variations in a test surface comprising:

a light source that produces a primary wavefront which is divided into a test wavefront and a reference wavefront;

a leading diffractive optic having a diffracting pattern of nonlinear paths for relatively reshaping the test wavefront from a form in common with the reference wavefront to a different form;

a first optical pathway through the interferometer traversing said leading diffractive optic for reflecting the test wavefront at a grazing angle from the test surface;

a second optical pathway through the interferometer that also traverses said leading diffractive optic for conveying the reference wavefront independently of the test surface between positions of alignment with the test wavefront;

a following diffractive optic having a diffracting pattern of nonlinear paths for further relatively reshaping the reflected test wavefront into a form in common with the reference wavefront; and a common optical pathway traversing said following diffractive optic for combining the further reshaped test wavefront and the reference wavefront and for producing a pattern of interference between the test and reference wavefronts indicative of variations in the test surface, wherein the test wavefront converges through a focus along said first optical pathway between the test surface and said following diffractive optic.

15. The interferometer of claim 14 in which said leading and following diffractive optics straddle the test surface along said first optical pathway.

16. The interferometer of claim 15 in which said leading and following diffractive optics are aligned to a common reference axis and the test wavefront converges through said focus on the common reference axis.

17. The interferometer of claim 16 in which said leading diffractive optic divides said test and reference wavefronts into different diffractive orders and said following diffractive optic recombines said test and reference wavefronts from different diffractive orders and at least one of said leading and following diffractive optics is arranged for balancing diffraction energies of the recombined reference and tee wavefronts.

18. A method of optically measuring a three-dimensional test surface at a grazing angle comprising the steps of:

positioning the test surface along an optical path between leading and following diffractive optics;

shaping a beam of light into a primary wavefront;

dividing the primary wavefront into a test wavefront and a reference wavefront;

relatively diffracting the test wavefront with respect to the reference wavefront with the leading diffractive optic into a form different than the reference wavefront;

reflecting the relatively diffracted test wavefront from the test surface at grazing incidence;

further relatively diffracting the test wavefront with respect to the reference wavefront with the following diffractive optic into a form in common with the reference wavefront;

combining the further relatively diffracted test wavefront with the reference wavefront;

producing an interference pattern between the combined test and reference wavefronts indicative of variations in the test surface; and relatively moving one of the diffractive optics with respect to the test surface for shifting phase between the test and reference wavefronts.

19. The method of claim 18 in which the combined test and reference wavefronts have a shape that matches the shape of the primary wavefront.

20. The method of claim 18 in which the leading and following diffractive optics have different diffracting patterns with nonlinear paths.

21. The method of claim 20 in which the test wavefront reshaped by the leading diffractive optic varies in angular orientation around an axis of propagation.

22. A method of optically measuring a three-dimensional test surface at a grazing angle comprising the steps of:

positioning the test surface along an optical path between leading and following diffractive optics;

shaping a beam of light into a primary wavefront;

dividing the primary wavefront into a test wavefront and a reference wavefront;

relatively diffracting the test wavefront with respect to the reference wavefront with the leading diffractive optic into a form different than the reference wavefront;

reflecting the relatively diffracted test wavefront from the test surface at grazing incidence;

further relatively diffracting the test wavefront with respect to the reference wavefront with the following diffractive optic into a form in common with the reference wavefront;

combining the further relatively diffracted test wavefront with the reference wavefront; and producing an interference pattern between the combined test and reference wavefronts indicative of variations in the test surface, wherein said step of reflecting the relatively diffracted test wavefront includes converging the test wavefront through a focus along the path between the test surface and said following diffractive optic.

23. The method of claim 22 in which said leading and following diffractive optics are aligned with a common reference axis corresponding to a reference point in the interference pattern.

24. The method of claim 23 in which axial distances along the reference axis at points of reflection of the test wavefront from the test surface relate to radial distances from the reference point in the interference pattern.

25. The method of claim 24 in which angles about the reference axis at the points of reflection from the test surface relate to angles about the reference point in the interference pattern.

26. The method of claim 25 in which variations in height normal to the test surface at the points of reflection from the test surface correspond to phase differences between the test and reference wavefronts in the interference pattern.

27. The method of claim 22 in which the leading diffractive optic also divides the primary wavefront into a test wavefront and a reference wavefront and at least one of said diffractive optics is arranged for balancing diffraction energies of the recombined reference and test wavefronts.

28. A method of measuring a test surface with a double-pass interferometer at grazing incidence comprising the steps of:

emitting a beam of light from a light source;

dividing the beam of light into first and second portions;

diffracting the first portion of the beam into a form different from the second portion of the beam along a path of grazing incidence to the test surface;

reflecting the first portion of the beam from the test surface at a grazing angle;

retroreflecting the reflected first portion of the beam back to the test surface along a return path toward the light source;

re-reflecting the retroreflected first portion of the beam from the test surface at the grazing angle;

rediffracting the re-reflected first portion of the beam into a form similar to the second portion of the beam along the return path to the light source; and at least partially reflecting the second portion of the beam along a path aligned with the return path of the first portion of the beam to produce an interference pattern between the first and second portions of the beam.

29. The method of claim 28 in which said step of at least partially reflecting includes a step of retroreflecting the second portion of the beam on a return path toward the light source.

30. The method of claim 29 in which said step of retroreflecting the second portion of the beam separates the second portion of the beam from the first portion of the beam that is diffracted toward the test surface.

31. The method of claim 30 in which said step of retroreflecting the second portion of the beam also combines the second portion of the beam with the first portion of the beam that is retroreflected toward the light source.

32. A method of measuring a test surface at grazing incidence comprising the steps of:

producing a primary wavefront;

dividing the primary wavefront into a test wavefront and a reference wavefront;

positioning the test surface along a first optical path between leading and following diffractive optics;

conveying the test wavefront along the first optical path for reflecting the test wavefront at grazing incidence from the test surface;

diffracting the test wavefront along the first optical path from a form in common with the reference wavefront to a different form;

conveying the reference wavefront along a second optical path independent of the test surface between positions of alignment with the test wavefront;

further diffracting the reflected test wavefront into a form in common with the reference wavefront;

recombining the test and reference wavefronts; and conveying the recombined test and reference wavefronts along a common optical path that produces a pattern of interference between the test and reference wavefronts indicative of variations in the test surface, wherein said step of diffracting is carried out by a diffractive optic and further comprising the step of relatively moving said diffractive optic with respective to the test surface for shifting phase between the test and reference wavefronts.

33. The method of claim 33 including the further step of concentrating diffraction energies of the diffractive optics into single respective orders.

34. The method of claim 32 including the further step of retroreflecting the test wavefront back to the test surface along the first path.

* * * * *